US007849509B2

(12) United States Patent
Venkatapathy et al.

(10) Patent No.: US 7,849,509 B2
(45) Date of Patent: Dec. 7, 2010

(54) DETECTION OF SECURITY VULNERABILITIES IN COMPUTER PROGRAMS

(75) Inventors: Ramanathan N Venkatapathy, Redmond, WA (US); Jayaraman Thiagarajan, Redmond, WA (US); Dong Wei, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 11/246,391

(22) Filed: Oct. 7, 2005

(65) Prior Publication Data

US 2007/0083933 A1    Apr. 12, 2007

(51) Int. Cl.
   *G06F 21/22* (2006.01)
   *G06F 11/00* (2006.01)
   *G06F 11/36* (2006.01)
(52) U.S. Cl. .............................. 726/25; 726/22; 726/23; 726/24; 717/126; 717/127; 717/131; 717/132
(58) Field of Classification Search ................... 726/22, 726/23, 25, 26; 713/165, 167; 382/196, 382/199; 710/6, 52, 55; 714/1, 6, 25, 33, 714/35, 37, 38, 48, 49, 715, 738; 715/234, 715/237, 239, 760, 762, 825, 968; 717/108, 717/112, 120, 124, 126, 127, 128, 131, 133, 717/141, 143, 144, 104
See application file for complete search history.

(56) References Cited

U.S. PATENT DOCUMENTS 5,652,899 A * 7/1997 Mays et al. ................ 715/239

| 5,875,330    | A  * | 2/1999  | Goti ......................... 717/104 |
| 6,832,302    | B1 * | 12/2004 | Fetzer et al. ................ 711/170 |
| 7,051,322    | B2 * | 5/2006  | Rioux ........................ 717/143 |
| 2004/0255277 | A1 * | 12/2004 | Berg et al. .................. 717/124 |
| 2005/0015752 | A1 * | 1/2005  | Alpern et al. ............... 717/131 |

OTHER PUBLICATIONS

Ganapathy et al., Buffer Overrun Detection using Linear Programming and Static Analysis, Oct. 27, 2003, ACM, Proceedings of the 10th ACM Conference on Computer and Communications Security (CCS '03), pp. 345-354.*

(Continued)

*Primary Examiner*—Taghi T Arani
*Assistant Examiner*—Kenneth Chang
(74) *Attorney, Agent, or Firm*—Mayer & Williams PC

(57) ABSTRACT

Methods and systems for analyzing a computer program use static and interprocedural analysis techniques and engines. A data processing operation, such as a function, is automatically identified within the computer program. It is determined whether the function represents a potential source for entry of untrusted data into the computer program. A course of the untrusted data is modeled through the identified function to produce a validation result, such as a call stack. Based on an attribute of the untrusted data (for example, whether the untrusted data is an unbounded integer or a string), it is determined whether the validation result identifies a security vulnerability of the computer program. A security vulnerability may exist, for example, when the modeled course of an unbounded integer through the function produces a buffer overrun in a call stack. The validation result is provided, via an API, software development tool, or user interface, for example.

9 Claims, 3 Drawing Sheets

OTHER PUBLICATIONS

Van Emmerik, Identifying Library Functions in Executable Files Using Patterns, Nov. 9, 1998, IEEE Computer Society, Proceedings of the Australian Software Engineering Conference, pp. 90-97.*

Copeland, Static Analysis with PMD, Feb. 12, 2003, O'Reilly Media, Inc.*

Xie et al., Archer: using symbolic, path-sensitive analysis to detect memory access errors, Sep. 1, 2003, ACM, Proceedings of the $9^{th}$ European Software Engineering Conference with $11^{th}$ ACM SIGSOFT international Symposium on Foundations of Software Engineering, pp. 327-336.*

\* cited by examiner

DETECTION OF SECURITY VULNERABILITIES IN COMPUTER PROGRAMS

BACKGROUND

It is generally desirable to correct defects in source code that adversely affect operation of software products. Source code defects that alter how information is stored during execution of a software product, such as defects that cause buffer overflow errors, have the potential to disrupt secure operation of the software product. For example, third parties may exploit buffer overflow errors to gain unauthorized access to a computer system or network—accessing confidential data or introducing dangerous or disruptive programs such as virus programs, worm programs, and Trojan horse programs.

Software developers have a wide variety tools and techniques for analyzing, describing, or documenting the behavior of software and for testing the integrity of source code throughout the product development process. Such tools and techniques are used, among other things, to identify source code defects, such as defects that cause buffer overflow errors, some of which represent threats to the secure operation of software products.

The size and complexity of most commercially valuable software products, however, makes detecting and reviewing every such source code defect impractical. Moreover, some programming languages (such as C and C++) have few built-in provisions for managing buffers or buffer lengths, so that applying typical tools and techniques to find source defects that result in buffer overflow errors may result in the identification of a generally inactionable number of source code defects.

SUMMARY

Methods and systems that use static and interprocedural analysis techniques to obtain information about the course of untrusted data through certain predetermined data processing operations (such as functions) within computer programs are presented.

A set of data processing operations representing a significant portion of the entry points of untrusted data into computer programs is defined. A data entry point analyzer compares a particular data processing operation within the computer program to the set of data processing operations, and assigns the particular data processing operation to an appropriate data entry point category.

Examples of data entry point categories include categories associated with the following: local procedure call ("LPC") and remote procedure call ("RPC") dispatch table functions; COM virtual table functions; Internet server application programming interface ("ISAPI") dispatch table functions; kernel-mode interrupt table functions; database access functions, such as registry access functions; network/Internet access functions, such as Winsock network access functions; and file access functions such as run-time library routines associated with programming languages like C++.

Analysis results include information about the modeling of the course of the untrusted data through the data processing operations that are found by the data entry point analyzer. For example, call stack information associated with the untrusted data, and references to locations in the source code where the untrusted data modifies the call stack to produce a buffer overflow, may be included in the analysis results.

A particular attribute of the untrusted data is identified (such as whether the untrusted data is an unbounded integer or a string), and the attribute is used to identify security vulnerabilities within the computer program. The attribute may be used, for example, to identify security vulnerabilities represented by buffer overflows caused by unbounded integers or strings. Such security vulnerabilities represent an actionable number of source code defects.

The analysis results are made available for use in various ways. For example, software tools may use application programming interfaces ("APIs") that are based on the analysis results and/or the attributes of the untrusted data to provide graphical user interfaces ("GUIs") to developers responsible for locating source code defects. Developers may use the GUIs to focus their attention on fixing an actionable number of source code defects that have the potential to disrupt secure operation of the computer program.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter.

DRAWINGS

DETAILED DESCRIPTION

Figure 1:
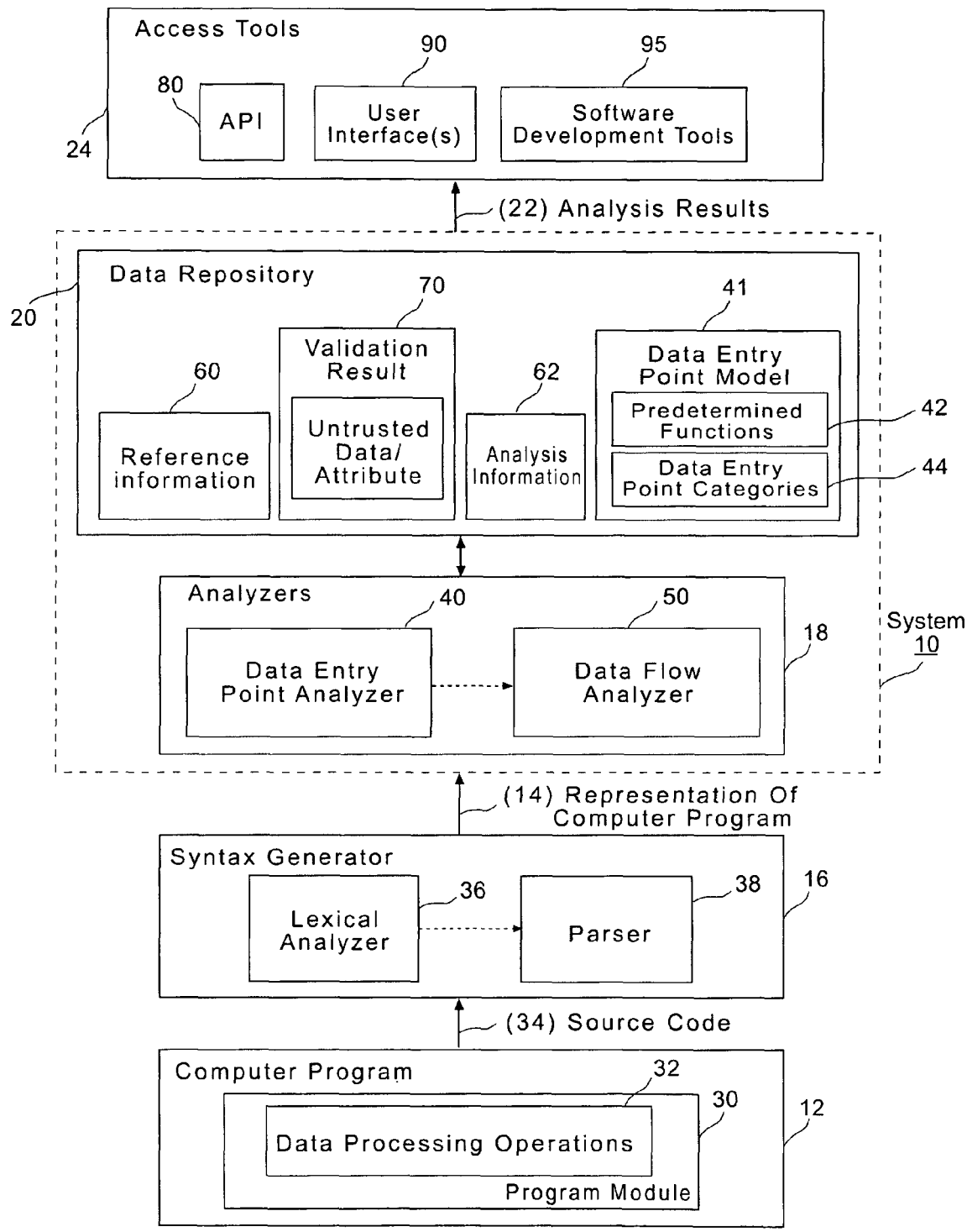
FIG. 1 is a block diagram of a system usable for analyzing a computer program to identify security vulnerabilities of the computer program.

Turning now to the drawings, where like numerals designate like components, FIG. 1 is a block diagram of an exemplary system 10 usable for analyzing a computer program 12 to identify security vulnerabilities of the computer program. Some security vulnerabilities are flaws—programming errors, for example—within a computer program. Other security vulnerabilities result from choices made about the design of a computer program. Sometimes, the strength of security features is only one factor to be considered when designing a computer program—other factors, such as simplicity of access, programming costs, and overhead costs, may also be considered. Certain security vulnerabilities make it possible for an attacker to gain unauthorized access to the computer program. For example, security vulnerabilities may make possible for an attacker to usurp privileges on the computer program user's system, regulate operation of the computer program, or compromise data used by the computer program or data stored on the system.

One type of security vulnerability results from the use of untrusted data within a particular data processing operation, such as a function, in a computer program. In one aspect, untrusted data includes any data receivable at a boundary between a trusted environment and an untrusted environment, such as data receivable from a source external to a computer program. One external source of data is data received when a program module (discussed further below) interacts with one or more program modules associated with another computer program (such program modules may pass data to/from each other via functions, for example). Another external source of data is data retrieved from external storage, such as data retrieved from files, registries, and networks.

In another aspect, data may become untrusted in certain contexts. For example, when violations of implicit or explicit contracts between callees and callers in data processing operations such as functions occur, untrusted data may result. Explicit contracts include preconditions (conditions that must exist or be established before the execution of the computer program can occur correctly) and postconditions (statements that are guaranteed to be true following the successful completion of an action) specifiable using source code annotation techniques or other features of a particular programming. For example, a precondition of the statement $y := sqrt(x)$ is that x is greater than or equal to zero. If this precondition is not met, a computer program implementing this function may malfunction. A postcondition of the statement $y := sqrt(x)$ is that $x=y^2$.

Untrusted data may further have one or more attributes—such as whether the untrusted data starts as an unbounded integer or a string, for example. Unbounded integers and strings are important because certain errors are recognized to occur when processing integers and strings. When processing integers, errors such as sign errors, truncation errors, and overflow errors may occur. Sign errors occur when a function converts between a signed and an unsigned integer—the bit pattern of the original integer is preserved, the value is sign-extended and then converted, and the high-order bit loses its function as a sign bit—when the value of the signed integer is negative, the result is a large positive value. Truncation errors occur when an integer is converted to a smaller integer type, and the value of the original integer is outside the range of the smaller type. Integer overflow errors occur when the result of an integer operation is above the maximum value for its type. When processing strings, certain errors are recognized to occur when using certain C library functions, such as "strcpy( )", "strcat( )", "getstr( )", among others. Such errors often result from a failure to validate that input strings do not exceed the size of the memory in which they will be stored.

Unbounded integers and strings are often exploited by malicious attackers to gain unauthorized access to a computer system or network, where the attackers can access confidential information, or introduce dangerous or disruptive programs such as virus programs, worm programs, or Trojan horse programs. Unbounded integers and strings may also inadvertently cause other problems with the secure execution of computer programs.

The manner in which unbounded integers and strings can disrupt secure operation of computer programs is well known. A fixed amount of memory is generally allocated to store data representing a number or a string on a call stack during operation of a computer program (the allocated memory is usually based on the number of characters in the string, or on the type of number being stored). Call stacks are used to keep track of computer program execution and state by storing return addresses in the calling function, arguments to the functions, and temporary values of local variables. When data representing strings or numbers is written to the call stack, the data is expected to be written within the boundaries of the memory allocated to the particular type of data being stored.

When a function allows unbounded integers or strings to be written to the call stack, data that is outside the boundaries of the memory allocated to a particular data type may be written to the call stack. The call stack may be modified by the out-of-bounds data, and that modification may change important information on the call stack, potentially changing the behavior of the computer program. For example, variables or return addresses on the call stack may be over-written, and the computer program may crash, or arbitrary or malicious code may be executed.

Referring again to FIG. 1, system 10 for analyzing computer program 12 to identify security vulnerabilities therein is arranged to receive a representation 14 of at least a portion of computer program 12 from syntax generator 16 (discussed further below). A representation of a computer program is any description of the computer program. Examples of representations of a computer program include, but are not limited to, forms taken by the computer program in the compilation process as it is converted from source code to object code.

Computer program 12 may be a single-module program, or may be composed of one or more program modules 30 that in turn include one or more data processing operations 32. An example of a computer program 12 composed of multiple linked program modules 30 is the Windows® operating system. Windows is either a registered trademark or trademark of Microsoft Corporation in the United States and/or other countries.

Program modules 30 associated with computer program 12 may exist in one or more forms, such as in source code (a source code file 34 is shown), object code, or executable code, among other forms. Source code file 34 includes computer-executable instructions written by a programmer in a programming language such as C, C++, or another programming language.

A single program module 30 in any form generally includes at least one data processing operation 32, and may include multiple data processing operations 32. A data processing operation 32 represents a set of computer-executable instructions configured to perform a predetermined operation on data (for example, any executable code is a data processing operation). A data processing operation may be referred to as a process, a task, a function, a routine, or by any other term now known or later adopted that designates the performance of predetermined operations on data.

System 10 itself (discussed further below) includes analyzers 18 (data entry point analyzer 40 and data flow analyzer 50) and data repository 20. Data repository 20 stores certain data accessed or produced by analyzers 18, including certain predetermined functions 42 and/or data entry point categories 44 associated with a data entry point model 41, reference information 60, analysis information 62, and a validation result 70. Validation result 70 is associated with untrusted data 72, which has certain attributes. System 10 provides analysis results 22 to access tools 24. Access tools include an API 80, user interface(s) 90, and software development tools 95.

Syntax generator 16, which includes a lexical analyzer 36 and a parser 38, receives a portion of computer program 12, such as source code file 34 (although other forms of computer program 12 are possible) and creates a representation 14 of computer program 12 which may be, for example, an abstract syntax tree ("AST") representation. An abstract syntax tree is a data structure representing code that has been parsed, from which code generation may be performed. A file (not shown) storing the AST representation may also be created. The AST file may be stored locally or remotely.

Internal arrangements, architectures and principles of operation of syntax generator 16 are well known. Lexical analyzer 36 produces a stream of tokens, and parser 38 assembles the code, which may be, for example, an abstract syntax tree, from the stream of tokens, based on the overall structure and flow of source code file 34. Syntax generator 16 may be implemented in whole or in part by a commercially available compiler, selected based on, among other things, the programming language in which source code file 34 is written. Alternatively, syntax generator 16 may be designed and implemented specifically for operation with system 10.

Analyzer block 18 includes the core analysis functions of system 10. Data entry point analyzer 40 and data flow analyzer 50 are special-purpose analysis engines, which are implemented by an arrangement of computer programs 306 (shown and discussed further below, in connection with FIG. 3) stored in one or more computer-readable media304 (also shown and discussed further below, in connection with FIG. 3), that coordinate the overall function of analyzing a computer program to identify security vulnerabilities therein. A flowchart of a method for analyzing a computer program, such as computer program 12, is discussed further below in connection with FIG. 2.

Data repository 20 includes various types and arrangements of computer-readable media 304 and information stored thereon, including but not limited to primary or secondary, volatile or non-volatile, mutable or immutable, block or file, data storage- or memory-type computer readable media 304.

In operation, data entry point analyzer 40 uses static analysis, which is analysis of a computer program carried out without executing the program, to automatically identify one or more data processing operations 32 within representation 14, and to determine whether the identified data processing operations represent potential sources for entry of untrusted data 72 into the computer program.

Data entry point model 41, which may be implemented using a database or another suitable data structure (such as an array, a hash table, and the like), defines predetermined functions 42 and data entry point categories 44 that are likely to represent significant portion of the entry points of untrusted data 72 into computer program 12. Data entry point analyzer 40 compares a particular data processing operation 32 to a predetermined function 42, and assigns data processing operation 32 to an appropriate data entry point category 44.

Examples of data entry point categories 44 include categories associated with the following: local procedure call ("LPC") and remote procedure call ("RPC") dispatch table functions; COM virtual table functions; Internet server application programming interface ("ISAPI") dispatch table functions associated with web server products; kernel-mode interrupt table functions; registry access functions; network/ Internet access functions, such as Winsock network access functions; and file access functions such as run-time library routines associated with programming languages like C++.

To aid in comparison and assignment of data processing operation 32 associated with a source code file written in C or C++, a list (not shown) of predetermined functions 42 corresponding to each data entry point category 44 may be built and included in a file (not shown). In one example, for LPC and RPC dispatch table functions, the type of declaration may be analyzed, and if the type of declaration matches "PCSR_ API_ROUTINE", then it is considered to be an LPC dispatch routine. If the type of declaration matches "SERVER_ ROUTINE", then it is considered to be an RPC dispatch routine. In another example, a function is identified as a COM function if it has a return type of type "HRESULT" and its class inherits from type "IUnknown". In a further example, an ISAPI dispatch table function is a function whose name matches any of the following names: "GetExtensionVersion", "GetFilterVersion", "HttpExtensionProc", "HttpFilterProc", "TerminateExtension", or "TerminateFilter", or any other ISAPI dispatch table function now known or later developed. With other functions, a list of functions corresponding to each data entry point type may be constructed by hand. Other untrusted data entry points or functions associated therewith may be defined. For example, additional untrusted data entry points or functions may be annotated using a set of code annotations. Code annotations are explanatory notes or comments that may be added to source code files, either by a compiler or by a programmer. They do not affect the working of the computer program.

After data entry point analyzer 40 identifies certain data processing operations 32 within representation 14 that correspond to information in data entry point model 41, such as predetermined functions 42 or data entry point categories 44, the identified data processing operations 32 are deemed to represent potential sources for entry of untrusted data 72 into the computer program. The course of untrusted data 72 through the identified data processing operations may then be modeled by data flow analyzer 50.

Data flow analyzer 50 (the detailed operation of which is discussed further below, and also in connection with FIG. 2) accesses and/or produces analysis information 62 and certain reference information 60 stored in data repository 20; models a course of untrusted data 72 through particular data processing operations 32; and produces validation result 70, which is used to identify security vulnerabilities in representation 14.

Access to validation result 70, and to other information such as analysis information 62 and reference information 60, is provided via analysis results 22 to access tools 24. For example, API 80, which represents a set of definitions of the ways system 10 may communicate with another system (such as a user interface 90 or software development tools 95), may be provided. Software development tools 95 that use API 80 may also be provided. The ways in which validation result 70 and other information may be used by both end users and other computer programs to identify security vulnerabilities in computer program 12 is discussed further below, in connection with FIG. 2.

Data flow analyzer 50 may be implemented by one or more aspects of various well-known interprocedural analysis techniques such as data flow analysis and pointer flow analysis. Data flow and pointer flow analysis involve setting up data flow equations for each node of a control flow graph and solving the equations repeatedly, calculating the output from the input locally at each node until the whole system reaches a fixed point. The fixed point can be reached using various well-known iterative algorithms. The efficiency of iteratively solving data-flow equations is influenced by the order at which local nodes are visited In postorder iteration, for example, a node is visited after all its successor nodes have been visited. Typically, the postorder iteration is implemented with the depth-first strategy The depth-first strategy involves selecting some node as the root node (e.g., the point at which untrusted data enters a function), and exploring as far as possible along each branch of the call graph before backtracking.

One tool that may be used to solve data flow equations is syntactic analysis, and another tool is semantic analysis. Syntactic analysis is the use of the syntactical structure of a computer program to solve data flow equations without simulating the exact control flow of the program. Semantic analysis is use of certain checks to solve data flow equations based on semantical information produced by a compiler.

Analysis information 62 and reference information 60 represent information used or produced by data flow analyzer 50. Such information may exist only temporarily (for example, as an in-memory representation) during certain operations of system 10, or may be stored in ways that enhance the scalability of system 10, such as being stored in files, databases, or other structures that allow the information to be re-used.

Analysis information 62 includes information on the lexical location, call graph, and untrusted data contexts for each function within the source code file. Untrusted data contexts refer to untrusted data 72 that is introduced when violations of implicit or explicit contracts between callees and callers in the functions of the source code file are possible. When stored, analysis information 62 may be stored using any type of format, file, or database, such as one or more text-based files implemented using extensible markup language ("XML") (a spec.xml file for example). An example of a spec.xml file that stores sample analysis information 62 is shown below.

Reference information 60 includes additional, optional information that may be stored about functions associated with computer program 12. Examples of reference information 60 include catalog files, such as function catalog files and AST catalog files.

A function catalog file includes information about each function processed and source code file information about the function, including the function name, or decorated name ("NAME") and the name of the source code file ("FILE") to which the function belongs. A function catalog file may be a text file (an XML-type text file, for example), a database, or another type of data storage structure. An example of an XML-type text file function catalog file is shown below, following the sample spec.xml file.

An AST catalog file is a comma-separated text file in which information about a source code file, such as the name of the source code file, is stored before the comma, and information about the AST representation, such as the name of a file that stores the AST representation to which it belongs, is stored after the comma. An example of an AST catalog file is shown below, following the sample function catalog file.

An example of a spec.xml file that stores sample analysis information 62 is shown below. The spec.xml file (contents discussed further below) is associated with a source code file that includes a function having the name "CreateReturnHandle."

```
<FUNCTION>
    <NAME>?CreateReturnHandle@@YGJPAX0PAPAX@Z</NAME>
    <DECORATEDNAME>
?CreateReturnHandle@@YGJPAX0PAPAX@Z</DECORATEDNAME>
    <FILE>d:\lh\sample\</FILE>
    <LINE>974</LINE>
    <ATTRIBUTE>0</ATTRIBUTE>
    <CALLERCONTEXT>
        <CXT_NAME>_LaunchRunAsServer@84</CXT_NAME>
        <CXT_FILE>d:\lh\ sample\</CXT_FILE>
        <CXT_LINE>399</CXT_LINE>
        <CXT_CALL_LINE>460</CXT_CALL_LINE>
        <PRECONDITION>
            <LOCATION>02_01_00</LOCATION>
            <INTRANGE>eUnBound_0_0</INTRANGE>
        </PRECONDITION>
        <POSTCONDITION>
            <LOCATION>02_01_00</LOCATION>
            <INTRANGE>eUnBound_0_0</INTRANGE>
            </POSTCONDITION>
    </CALLERCONTEXT>
    <CALLERCONTEXT>
        <CXT_NAME>_LaunchActivatorServer@92</CXT_NAME>
        <CXT_FILE>d:\lh\sample\</CXT_FILE>
        <CXT_LINE>323</CXT_LINE>
        <CXT_CALL_LINE>387</CXT_CALL_LINE>
        <PRECONDITION>
            <LOCATION>02_01_00</LOCATION>
            <INTRANGE>eUnBound_0_0</INTRANGE>
        </PRECONDITION>
```

-continued

```
        <POSTCONDITION>
            <LOCATION>02_01_00</LOCATION>
            <INTRANGE>eUnBound_0_0</INTRANGE>
        </POSTCONDITION>
    </CALLERCONTEXT>
    <CALLEECONTEXT>
        <CXT_NAME>GetCurrentProcess@0</CXT_NAME>
        <CXT_FILE>d:\lh\com\spice_external.c</CXT_FILE>
        <CXT_LINE>16777215</CXT_LINE>
        <CXT_CALL_LINE>976</CXT_CALL_LINE>
    </CALLEECONTEXT>
    <CALLEECONTEXT>
        <CXT_NAME>DuplicateHandle@28</CXT_NAME>
        <CXT_FILE>d:\lh\com\spice_external.c</CXT_FILE>
        <CXT_LINE>16777215</CXT_LINE>
        <CXT_CALL_LINE>976</CXT_CALL_LINE>
        <PRECONDITION><LOCATION>03_01_00</LOCATION>
            <INTRANGE>eUnBound_0_0</INTRANGE>
        </PRECONDITION>
            <POSTCONDITION><LOCATION>03_01_00</LOCATION>
            <INTRANGE>eUnBound_0_0</INTRANGE>
        </POSTCONDITION>
    </CALLEECONTEXT>
    <CALLEECONTEXT>
        <CXT_NAME>GetLastError@0</CXT_NAME>
        <CXT_FILE>d:\lh\com\spice_external.c</CXT_FILE>
        <CXT_LINE>16777215</CXT_LINE>
        <CXT_CALL_LINE>985</CXT_CALL_LINE>
    </CALLEECONTEXT>
</FUNCTION>
```

The above spec.xml file includes the name of the function ("NAME"); a decorated name of the function ("DECORATEDNAME"); the name of the source code file in which the function is located ("FILE"), and the line number inside the source code file at which the function is located ("LINE"). The spec.xml file also includes Additional characteristics ("ATTRIBUTE") of the function, such as whether it is called from a thread. The functions from which calls were made to this function are labeled ("CALLERCONTEXT") and their associated information includes names of the caller functions ("CXT_NAME"), files in which the functions belong ("CXT_ FILE"), line numbers where the calls are made ("CXT_ CALL_LINE"), the untrusted data contexts of the functions, including precondition ("PRECONDITION") and postcondition ("POSTCONDITION") information, and information about one or more attributes of untrusted data 72 associated with the caller functions, such as whether the untrusted data represents an unbounded integer ("INTRANGE") or a string. The function calls made inside this function are labeled "CALLEE CONTEXT", and their associated information includes names of the callee functions ("CXT_NAME"), files in which the functions belong ("CXT_ FILE"), line numbers where the calls are made ("CXT_ CALL_LINE"), the untrusted data contexts of the functions, including precondition ("PRECONDITION") and postcondition ("POSTCONDITION") information, and information about one or more attributes of untrusted data 72 associated with the callee functions, such as whether the untrusted data is an unbounded integer ("INTRANGE") or a string.

An example of an XML-type text file function catalog file is shown below.

```
<FUNCTION>
    <NAME>??0CAutoWin32Handle@@QAE@PAX@Z</NAME>
    <FILE>d:\lh\admin\activec\inc\autoptr.h</FILE>
</FUNCTION>
```

An example of an AST catalog file follows.

```
d:\lh\admin\activec\base\bookkeepingdialog.cpp,d:\lh\admin\activec\base\
objfre\i386\bookkeepingdialog.ast
d:\lh\admin\activec\inc\autoptr.h,d:\lh\admin\activec\base\objfre\i386\
bookkeepingdialog.ast
```

Figure 2:
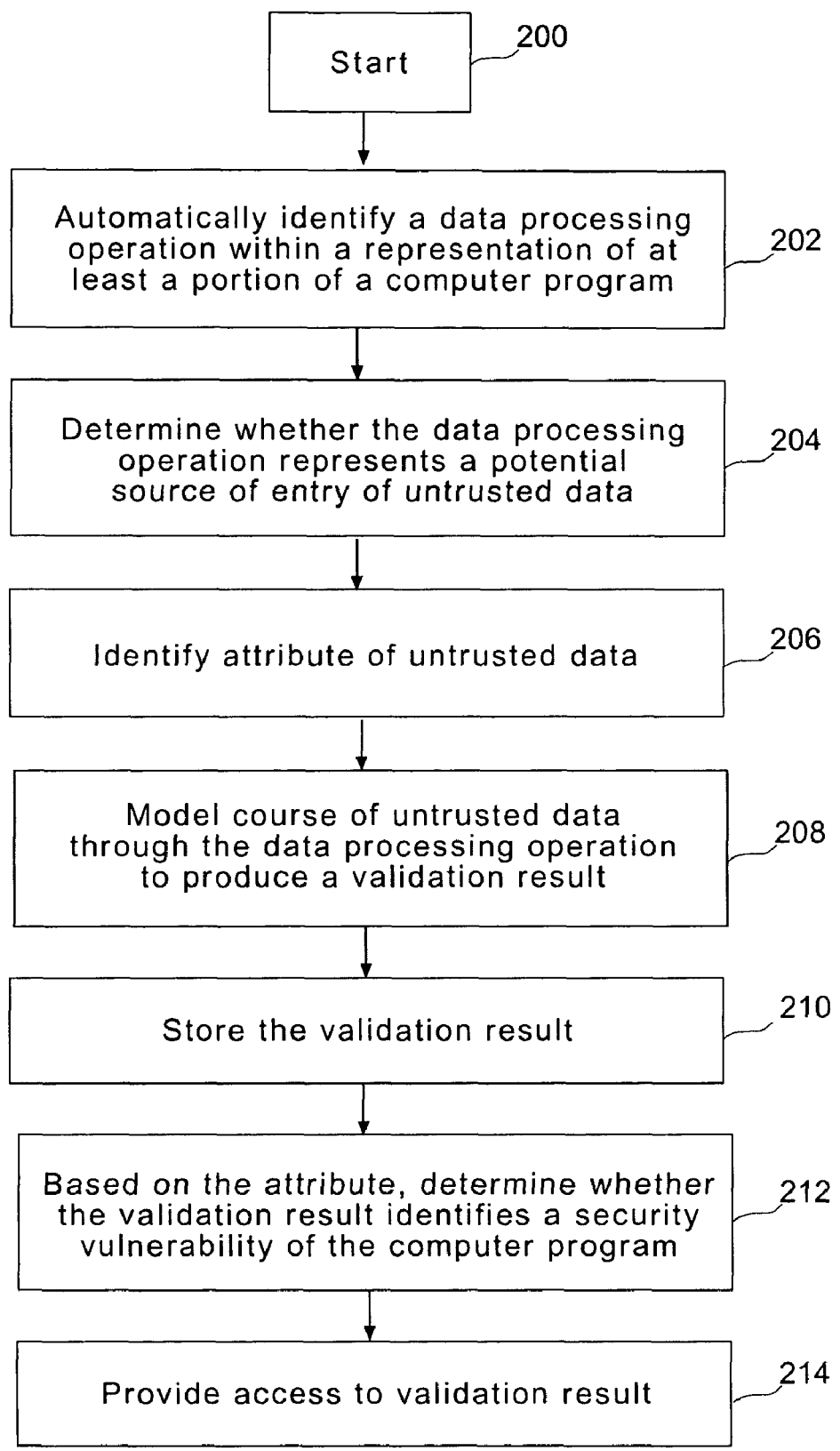
FIG. 2 is a flowchart of a method for analyzing a computer program to identify security vulnerabilities of the computer program.

With continued reference to FIG. 1, FIG. 2 is a flowchart of a method for analyzing a computer program, such as computer program 12, to identify security vulnerabilities of the computer program. The method is implemented when one or more computer programs, such as computer programs 306 (shown in FIG. 3 and discussed further below) are loaded into a processor, such as processor 302 (also shown in FIG. 3 and discussed further below), and executed.

The method begins at block 200, and continues at block 202, where a data processing operation, such as a data processing operation 32 (a function, for example), is automatically identified within a representation, such as an AST representation 14, of at least a portion of the computer program, such as source code file 34 associated with a programming module 30 of computer program 12. In operation of system 10, for example, data entry point analyzer 40 may use static analysis to automatically identify a particular function within representation 14.

At block 204, it is determined whether the identified data processing operation represents a potential source for entry of untrusted data into the computer program.

In the example herein, data entry point analyzer 40 is configured to compare the identified function within representation 14 to information in data entry point model 41, such as predetermined functions 42 or predetermined data entry point categories 44. When data entry point model 41 includes a predetermined function 42 and/or a predetermined data entry point category 44 corresponding to the identified function, the identified function is deemed to represent a potential source for entry of untrusted data into the computer program.

An attribute of the untrusted data is identified at block 206. One or more attributes of untrusted data—whether the untrusted data starts as a string or as an unbounded integer, for example—aid in the identification of programming situations related to handling of such untrusted data that result in vulnerabilities in the computer program that should be corrected.

At block 208, a course of the untrusted data is modeled through the identified data processing operation, to produce a validation result.

The course of untrusted data 72 through the identified function may be modeled by data flow analyzer 50 using AST representation 14 and analysis information 62 associated with source code file 34. First, the strings and integers that start as untrusted data are identified within the identified function. Analysis information 62, along with reference information 60 such as function catalogs and the AST catalog, are used locate the identified function, the functions that call and are called by the identified function, and the untrusted data to be tracked.

Next, the aliasing and validation of the untrusted data is tracked, using interprocedural analysis techniques, through the identified function in a depth-first fashion starting from the entry point(s) identified using data entry point analyzer 40. Aliasing involves the identification of memory locations, such as call stack locations, that may be accessed in more than one way. Alias analysis computes pairs of expressions that may point to the same memory location. For the various contexts in which untrusted data may arise in a function, such as callee and caller contexts, the content of memory locations that hold a given value of the untrusted data at a given point, along a given execution path, are monitored and recorded. Information about the data flow, including records (for example, call stacks) of the content of memory locations that stored untrusted data, is stored as validation result 70 (into a spec.xml file, for example), at block 210. Validation result 70 may be stored in the same manner and/or the same location or file(s) as analysis information 62, or in other manners or locations.

Based on the attribute identified at block 206, it is determined, at block 212, whether the stored validation result identifies a security vulnerability of the computer program.

For example, if the attribute of the untrusted data is an untrusted integer or a string, and if validation result 70 includes a call stack that has a buffer overflow associated with the untrusted data, then a security vulnerability may be identified at a particular location in the source code file. Analysis information 62 or reference information 60 may be used to locate the particular data processing operation and untrusted data that caused the buffer overflow, and locations, such as source code line numbers, may be identified.

Buffer overflows that occur as a result of the manipulation of untrusted data within the functions defined and identified by data entry point analyzer 40 have a high potential to disrupt secure operation of the computer program, and may therefore be deemed to be security vulnerabilities.

Although the total number of buffer overflows in a computer program may be generally large and inactionable, the number of buffer overflows associated with functions that represent potential sources for entry of untrusted data is likely to be a more manageable number. The further identification of buffer overflows associated with untrusted data having particular attributes (such as whether the data is an unbounded integer or a string), may be an even smaller number.

Access to validation result 70, and optionally to other information such as analysis information 62 and reference information 60, is provided at block 214. A user interface 90, such as a GUI, may be provided. The GUI may be made available, for example, by a software development tool, such as tool 95, that uses an API based on validation result 70, such as API 80, to provide a set of functions used to draw windows or icons associated with the GUI. Developers may use the GUI to focus their attention on fixing the actionable number of source code defects represented by the security vulnerabilities.

A GUI, for example, may present the source code associated with a computer program in a portion of the user interface, such as a window. Various queries that may be run during the code review may be presented to the developer in another portion of the user interface. One example of a query is "check all untrusted input." When a developer runs the query "check all untrusted input," the data processing operations that are deemed by data entry point analyzer 40 and/or data entry point model 41 to represent potential sources for entry of untrusted data into the computer program may be identified in a further portion of the user interface. A still further portion of the user interface may indicate, based on an examination of validation result 70, when untrusted data with a particular attribute (for example, an unbounded integer or a string) caused a buffer overflow on a call stack. Analysis information 62 or reference information 60 may be used to locate the particular data processing operation and untrusted data that caused the buffer overflow (for example, locations, such as source code line numbers, may be provided.)

Thus, methods and systems that use static and interprocedural analysis techniques to obtain information about the course of untrusted data through certain predetermined data processing operations within computer programs have been described. Such systems and methods may be used alone or in combination with other techniques, such as source code annotation techniques. An actionable number of security vulnerabilities, such as programming errors, may be identified by identifying a particular attribute of the untrusted data (such as whether the untrusted data is an unbounded integer) and considering that attribute when examining analysis results such as call stacks. The amount of intervention required to assess and fix instances of source code defects resulting from buffer overflows in computer programs can be reduced, and developers can focus their attention on fixing source code defects that have the potential to disrupt secure operation of the computer program.

Figure 3:
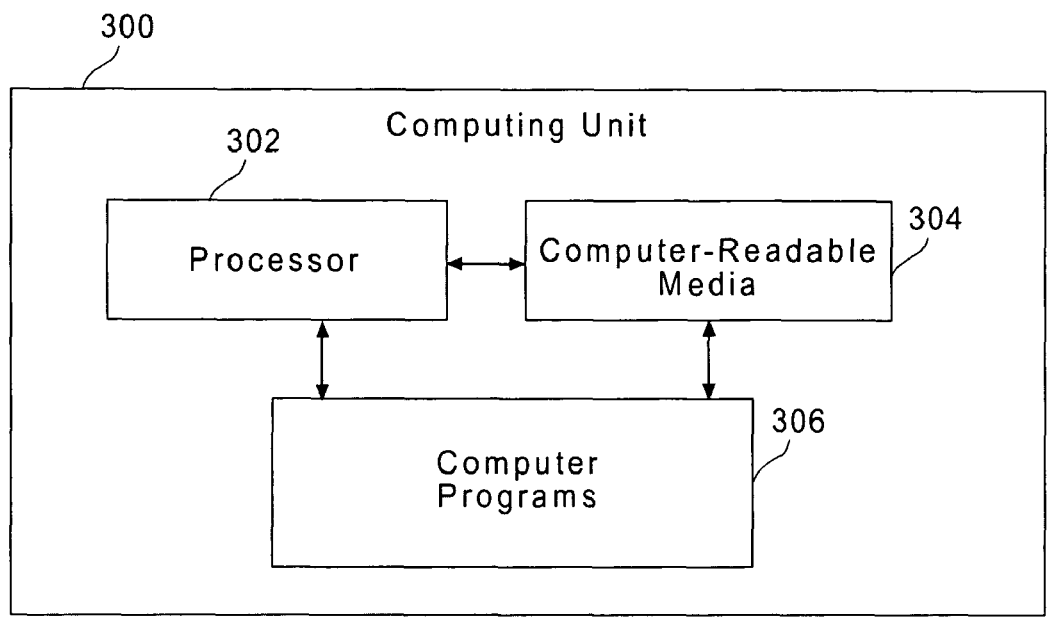
FIG. 3 is a block diagram of a general-purpose computing unit usable in connection with the system (or element(s) thereof), shown in FIG. 1.

FIG. 3 is a block diagram of a general-purpose computing unit 300, illustrating certain functional components that may be used to implement, may be accessed by, or may be included in, various elements shown in FIG. 1. For example, one or more components of computing unit 300 may be used to implement, be accessible by, or be included in, syntax generator 16, analyzers 18, data repository 20, or access tools 24.

A processor 302 is responsive to computer-readable storage media 304 and to computer programs 306. Processor 302, which may be a real or a virtual processor, controls functions of an electronic device by executing computer-executable instructions.

Computer-readable storage media 304 represents any number and combination of local or remote devices, in any form, now known or later developed, capable of recording or storing computer-readable data. In particular, computer-readable storage media 304 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof.

Computer programs 306 represent any signal processing methods or stored instructions that electronically control predetermined operations on data. In general, computer programs 306 are computer-executable instructions implemented as software components according to well-known practices for component-based software development, and encoded in computer-readable media (such as computer-readable media 304). Computer programs 306, however, may be implemented in software, hardware, firmware, or any combination thereof.

Figure 4:
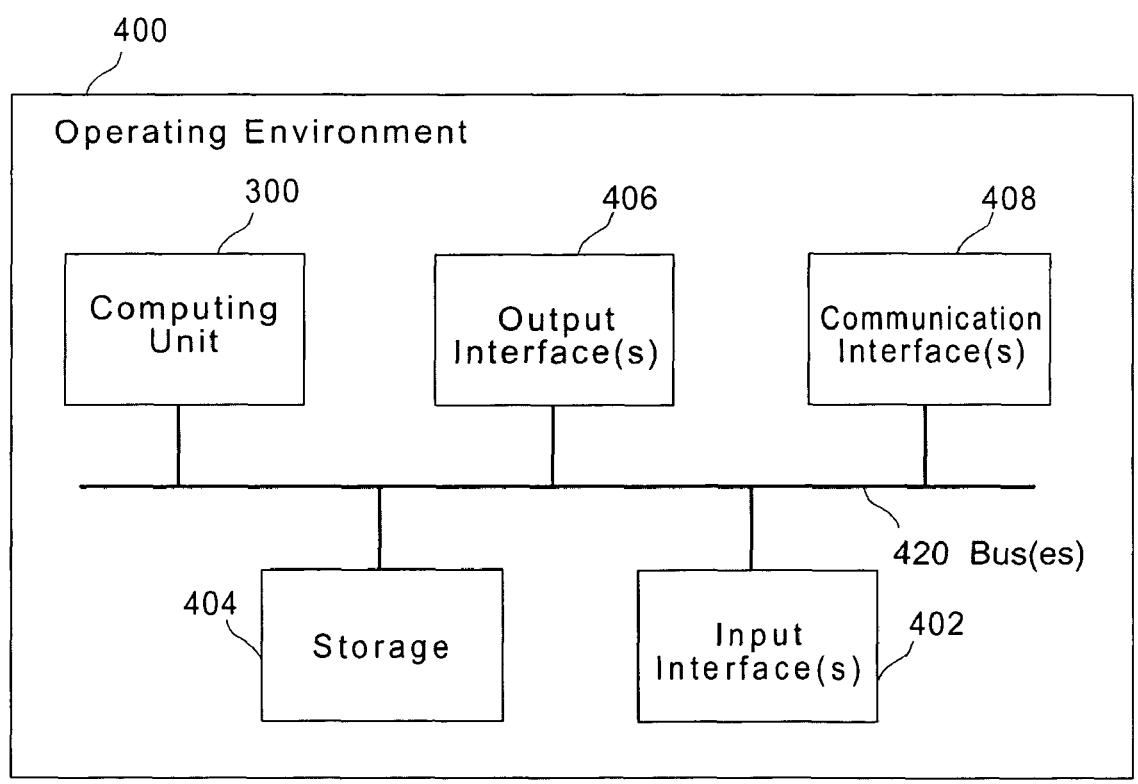
FIG. 4 is a block diagram of a configuration of an operating environment in which the system shown in FIG. 1 may be implemented.

With continued reference to FIG. 3, FIG. 4 is a block diagram of an exemplary configuration of an operating environment 400 in which system 10 may be implemented. Operating environment 400 is generally indicative of a wide variety of general-purpose or special-purpose computing environments. Operating environment 400 is only one example of a suitable operating environment and is not intended to suggest any limitation as to the scope of use or functionality of the system(s) and methods described herein. For example, operating environment 400 may be a type of computer, such as a personal computer, a workstation, a server, a portable device, a laptop, a tablet, or any other type of computing device now known or later developed, or any aspect thereof. Operating environment 400 may also be a distributed computing network or a Web service, for example.

A specific example of operating environment 400 is an environment that implements an API, such as a WIN32 API, common to certain Windows® operating systems.

As shown, operating environment 400 includes or accesses components of computing unit 300 (shown in FIG. 3), including processor 302, computer-readable media 304, and computer programs 306. Storage 404 includes additional or different computer-readable media associated specifically with operating environment 400. One or more internal buses 420, which are well-known and widely available elements, may be used to carry data, addresses, control signals and other information within, to, or from computing environment 400 or elements thereof.

Input interface(s) 402 provide input to computing environment 400. Input may be collected using any type of now known or later-developed interface, such as a user interface. User interfaces may be touch-input devices such as remote controls, displays, mice pens, styluses, trackballs or keyboards. Additional types of input devices include microphones, scanning devices, and all types of devices that output data.

Output interface(s) 406 provide output from computing environment 400. Examples of output interface(s) 406 include displays, printers, speakers, disk drives, and the like.

External communication interface(s) 408 are available to enhance the ability of computing environment 400 to receive information from, or to transmit information to, another entity via a communication medium such as a computer-readable storage medium. External communication interface(s) 408 may be, or may include, elements such as cable modems, data terminal equipment, media players, data storage devices, personal digital assistants, or any other device or component/combination thereof, along with associated network support devices and/or software or interfaces.

Exemplary configurations of system 10 and elements thereof have been described. It will be understood, however, system 10 may include fewer, more or different components or functions than those described herein.

In one example, computing unit 300 may be used with a variety of general purpose or special purpose computers, devices, systems, or products, including but not limited to elements of system 10 (for example, one or more processors packaged together or with other elements of system 10 may implement functions described herein in a variety of ways), personal home or office-based computers, networked computers, personal communication devices, home entertainment devices, and the like.

In another example, although reference information 60, analysis information 62, validation result 70, and data entry point model 41 are shown to exist within data repository 20, such data need not be disposed within, or accessed by every element of, system 10—design choices may dictate the specific element(s) of system 10 that store or access particular data, or that store or execute particular computer-executable instructions.

It will also be understood that functions described herein are not limited to implementation by any specific embodiments of computer programs. Rather, functions are processes that convey or transform data, and may generally be implemented by, or executed in, hardware, software, firmware, or any combination thereof, located at, or accessed by, any combination of elements of system 10. Functionality implemented by computer programs may be implemented by computer programs that are combined or distributed in various ways.

It will further be understood that when one element is indicated as being responsive to another element, the elements may be directly or indirectly coupled. Connections depicted herein may be logical or physical in practice to achieve a coupling or communicative interface between elements. Connections may be implemented as inter-process communications among software processes, or inter-machine communications among networked computers.

The claimed subject matter is not limited to implementations that solve any or all of the disadvantages of other computer program analysis tools or techniques. As it is understood that embodiments other than the specific embodiments described above may be devised without departing from the spirit and scope of the appended claims, it is intended that the scope of this invention will be governed by the following claims.

The invention claimed is:

1. A computer-readable storage medium encoded with computer-executable instructions which, when executed by a processor, perform a method for analyzing source code of a computer program, comprising:
   generating an abstract syntax tree ("AST") representation of the source code of the computer program;
   accessing a data entry point model, the data entry point model defining a plurality of predetermined function calls and a plurality of data entry point categories, at least some of the plurality of predetermined function calls associated with at least some of the plurality of data entry point categories;
   automatically identifying a plurality of data processing operations within the AST representation;
   for each identified data processing operation of the identified plurality of data processing operations,
      determining whether the identified data processing operation represents a potential source for entry of untrusted data into the computer program, based on whether the identified data processing operation comprises one of the plurality of predetermined function calls within at least one of the plurality of data entry point categories;
      identifying an attribute of the untrusted data;
      in a depth-first fashion, modeling a course of the untrusted data through the identified data processing operation to produce a validation result;
      storing the validation result, wherein the stored validation result comprises a call stack associated with the untrusted data;
      based on the identified attribute, determining that the stored validation result identifies a security vulnerability of the computer program when the call stack includes a buffer overflow caused by the untrusted data; and providing access to the stored validation result, when the stored validation result identifies a security vulnerability, the stored validation result usable to identify a corresponding programming error in the source code, a quantity of identified security vulnerabilities, and an amount of intervention to assess and fix the corresponding programming errors in the source code, able to be reduced based on a number of predetermined function calls within the plurality of predetermined function calls, or a number of data entry point categories within the plurality of data entry point categories, or both.

2. The computer-readable storage medium according to claim 1, wherein the untrusted data comprises data receivable at a boundary between a trusted environment and an untrusted environment.

3. The computer-readable storage medium according to claim 1, wherein the attribute comprises one of an unbounded integer status of the untrusted data and a string status of the untrusted data.

4. The computer-readable storage medium according to claim 1, wherein the step of providing access to the stored validation result comprises:
   providing access to an application programming interface ("API") based on the stored validation result.

5. The computer-readable storage medium according to claim 1, wherein the step of providing access to the stored validation result comprises:
   providing access to a user interface, the user interface operable to receive the stored validation result and, based on the stored validation result, to identify a programming error in the source code file from which the security vulnerability of the computer program arises.

6. A system for analyzing source code of a computer program, comprising:
   a computer-readable storage medium; and
   a processor responsive to the computer-readable storage medium and to a computer program, the computer program, when loaded into the processor, operable to perform a method comprising
   generating an abstract syntax tree ("AST") representation of the source code of the computer program,
   accessing a data entry point model, the data entry point model defining a plurality of predetermined function calls and a plurality of data entry point categories, at least some of the plurality of predetermined function calls associated with at least some of the plurality of data entry point categories,
   automatically identifying a plurality of data processing operations within a representation of at least a portion of the computer program within the AST representation,
   for each identified data processing operation of the identified plurality of data processing operations,
      determining whether the identified data processing operation represents a potential source for entry of untrusted data into the computer program, based on whether the identified data processing operation comprises one of the plurality of predetermined function calls within at least one of the plurality of data entry point categories,
      identifying an attribute of the untrusted data,
      in a depth-first fashion, modeling a course of the untrusted data through the identified data processing operation to produce a validation result, wherein the validation results comprises a call stack associated with the untrusted data, the call stack produced based on the modeled course of the untrusted data through the predetermined function,
      storing the validation result,
      based on the identified attribute, determining that the stored validation result identifies a security vulnerability of the computer program when the call stack includes a buffer overflow caused by the untrusted data, and wherein when the stored validation result identifies a security vulnerability, the stored validation result usable to identify a corresponding programming error in the source code, and
      providing access to the stored validation result, a quantity of identified security vulnerabilities, and an amount of intervention to assess and fix the corresponding programming errors in the source code, able to be reduced based on a number of predetermined function calls within the plurality of predetermined function calls, or a number of data entry point categories within the plurality of data entry point categories, or both.

7. The system according to claim 6, wherein the attribute comprises one of an unbounded integer status of the untrusted data and a string status of the untrusted data.

8. The system according to claim 6, wherein the untrusted data comprises data receivable at a boundary between a trusted environment and an untrusted environment.

9. A computer-readable storage medium encoded with computer-executable instructions which, when executed by a processor, perform a method for analyzing source code of a computer program, comprising:

generating an abstract syntax tree ("AST") representation of the source code of the computer program;

accessing a data entry point model, the data entry point model defining a plurality of predetermined function calls and a plurality of data entry point categories, at least some of the plurality of predetermined function calls associated with at least some of the plurality of data entry point categories;

automatically identifying a plurality of data processing operations within a representation of at least a portion of the computer program within the AST representation;

for each identified data processing operation of the identified plurality of data processing operations, generating an extensible markup language ("XML") model of the identified data processing operation, the XML model including information comprising an indication of the identified data processing operation, an indication of a source code file within which the identified data processing operation is located, an indication of a location of the identified data processing operation within the source code file, and an indication of call contexts;

determining whether the identified data processing operation represents a potential source for entry of untrusted data into the computer program, based on whether the identified data processing operation comprises one of the plurality of predetermined function calls within at least one of the plurality of data entry point categories, and based on the indication of call contexts;

identifying an attribute of the untrusted data;

in a depth-first fashion, modeling a course of the untrusted data through the identified data processing operation to produce a validation result by using the XML model to track aliasing of the untrusted data through the identified data processing operation and by using the XML model to track validation of the untrusted data through the identified data processing operation;

storing the validation result, wherein the stored validation result comprises a call stack associated with the untrusted data;

based on the identified attribute, determining that the stored validation result identifies a security vulnerability of the computer program when the call stack includes a buffer overflow caused by the untrusted data; and providing access to the stored validation result, when the stored validation result identifies a security vulnerability, the stored validation result usable to identify a corresponding programming error in the source code, a quantity of identified security vulnerabilities, and an amount of intervention to assess and fix the corresponding programming errors in the source code, able to be reduced based on a number of predetermined function calls within the plurality of predetermined function calls, or a number of data entry point categories within the plurality of data entry point categories, or both.

* * * * *